Sept. 4, 1951 J. J. HEALY 2,566,833
HOSE FOR IRRIGATING PURPOSES.
Filed Feb. 1, 1950
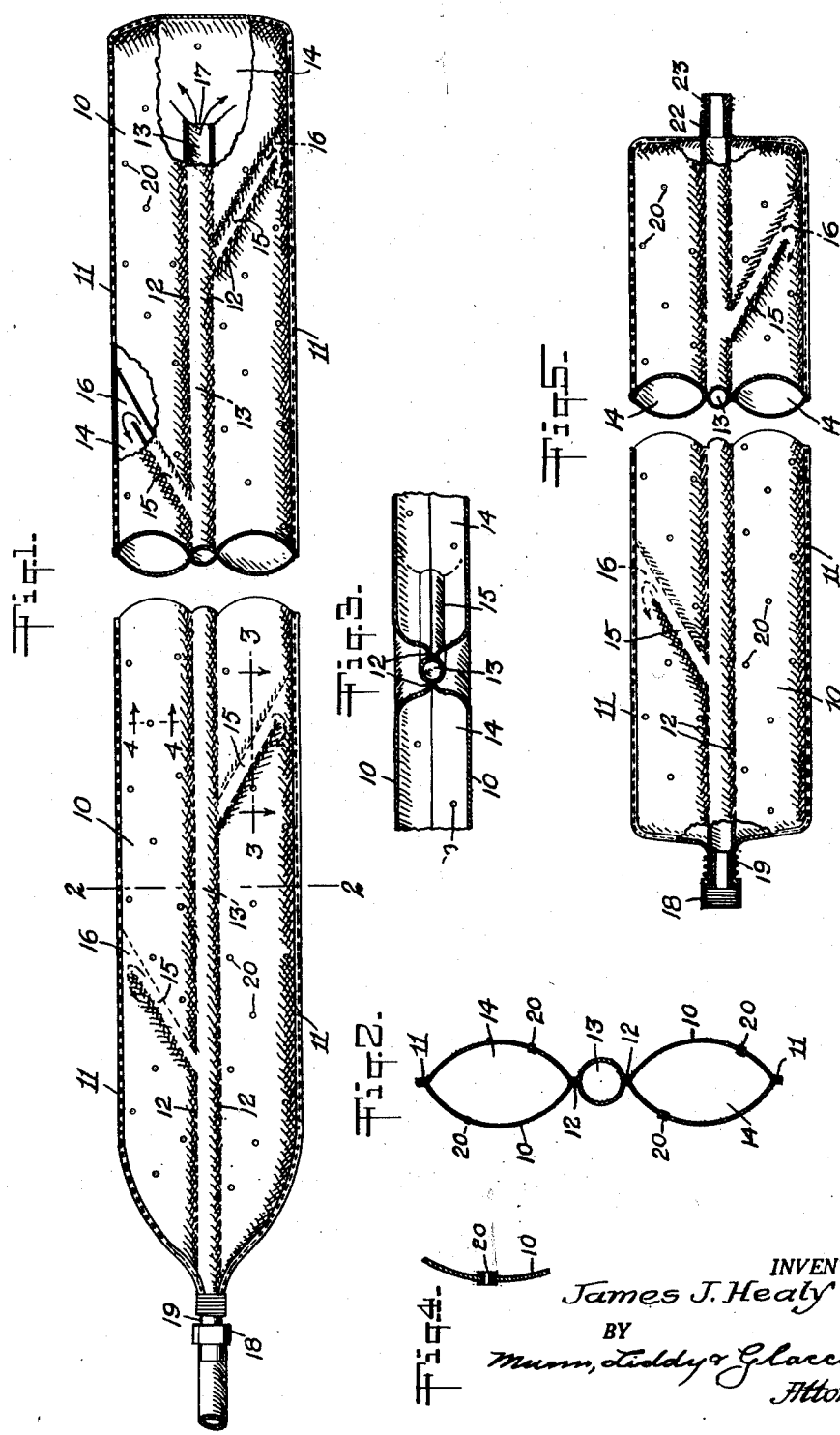
INVENTOR.
James J. Healy
BY
Munn, Liddy & Glaccum
Attorneys Patented Sept. 4, 1951

2,566,833

UNITED STATES PATENT OFFICE 2,566,833

HOSE FOR IRRIGATING PURPOSES

James J. Healy, New York, N. Y.

Application February 1, 1950, Serial No. 141,782

9 Claims. (Cl. 299—104)

1

This invention relates to a hose for irrigating purposes.

Among the benefits and advantages of the present invention are the following. Soil may be irrigated at the roots of plants of all kinds for the effectual watering thereof. Water by gravity flow or under a small amount of pressure may be used to quickly and evenly reach all irrigating areas, at or near buildings, trees, walks, shrubs, and all kinds of plants in flower and vegetable gardens, and any other places where it is desirable to water only the soil. Water wastage is reduced. Plant tops are kept from burning as by untimely watering in the sunlight.

A further object of the invention is the provision of a hose of the indicated character which reduces twisting and kinking, and which easily may be rolled up when not in use.

A still further object of this invention is the provision of a hose of the indicated character which may be laid on the ground to water plants set apart in rows or scattered.

With the foregoing, other objects of the invention will appear when the following specification is read in conjunction with the accompanying drawing in which, Fig. 1 is a plan view of a length of hose, embodying the features of the present invention, portions being broken away;

Fig. 2 is an enlarged sectional view taken on the line 2—2 of Fig. 1;

Fig. 3 is a detail sectional view taken on the line 3—3 of Fig. 1;

Fig. 4 is a detail sectional view taken on the line 4—4 of Fig. 1;

Fig. 5 is a view similar to Fig. 1, but showing a modification.

The hose is constructed of soft flexible material such as textile fabric or sheet rubber. In the present instance the hose, by way of example, is illustrated and hereinafter described as being constructed of textile fabric which may be ducking or canvas waterproofed.

Two strips 10 of the fabric are laid together one on the other. Lines of stitching 11 along the marginal edge portions of the strips close the opposite sides and one end of the structure. Other lines of stitching 12 combined with the stitching 11 form a lengthwise liquid feed passage 13 between a plurality of liquid distributing chambers 14 paralleling the passage 13, the latter having branches 15 which communicate with the chambers 14, as at 16. The passage 13 has an outlet 17 communicating with the tail end chamber 14. The inlet end of the passage 13

2 communicates with a female coupling 18 secured in any suitable manner to the material of the strips 10. As shown in Fig. 1, the strips have small tabs which take the stitching 12 providing a neck 19 surrounding and clamped to the coupling 18.

The flow capacity of the branches 15 is less than that of the main passage 13. Consequently the water, especially under pressure, will be delivered evenly throughout the length of the hose.

The material of the strips 10 has a multiplicity of liquid discharge orifices formed therein communicating with the chambers 14. To avoid enlargement of the orifices, use is made of metal eyelets 20 secured to the fabric to provide the orifices. The eyelets may be of a size for mere trickle of water, or large enough for discharging the water in jets or sprays. When the hose is laid on the ground, some of the water trickles or seeps downwardly from the hose into the soil, and some of the water flows out laterally and upwardly in jets, as will be understood.

In accordance with the invention, the lines of stitching 12 may be continued to enable the use of a male coupling, 23 as shown in Fig. 5. For this purpose the strips 10 have small tabs which take the stitching 12, forming a neck 22 surrounding and clamped to the coupling 23. Such expedient produces a hose section or unit useful in itself, or capable of being coupled to others so as to make a hose of any desired length. When a single section or unit of this type is used, a cap will be applied to the coupling 23.

From the foregoing it will be apparent all the advantages and benefits set forth above may be attained.

It is to be understood that instead of strips of fabric, use may be made of strips of sheet rubber which will be vulcanized to provide the passages. It is also to be understood that the invention includes all constructions and modifications coming within the scope of the appended claims.

I claim:

1. A soil irrigating device consisting of flexible material impervious to liquid, said material forming a lengthwise liquid feed passage and a lengthwise liquid distributing chamber, said feed passage having an inlet end and outlets communicating with the distributing chamber, and said material having a multiplicity of liquid discharge orifices communicating with the distributing chamber.

2. A soil irrigating device as set forth in claim 1, wherein the material consists of stout textile fabric.

3. A soil irrigating device as set forth in claim 2, wherein said orifices are formed by eyelets secured to the fabric.

4. A soil irrigating device as set forth in claim 1, wherein said material consists of canvas and passage and chamber are formed by lines of stitching taken in the material.

5. A soil irrigating device as set forth in claim 1, wherein said feed passage has outlet branches at intervals communicating with said distributing chamber.

6. A soil irrigating device as set forth in claim 1, wherein one end of the feed passage has a coupling member connected therewith.

7. A soil irrigating device consisting of flexible material impervious to liquid, said material forming a lengthwise liquid feed passage and lengthwise liquid distributing chambers parallel to the feed passage, said feed passage having an inlet end and outlets communicating with the distributing chambers and said material having a multiplicity of liquid discharge orifices communicating with the distributing chambers.

8. A soil irrigating device comprising two pieces of flexible material impervious to liquid, said pieces laid together and secured to each other thereby forming a lengthwise liquid feed passage and lengthwise liquid distributing chambers parallel to the feed passage, said feed passage having an inlet end and outlet branches at intervals in communication with said distributing chambers, and said material having a scattered multiplicity of liquid discharge orifices communicating with said distributing chambers.

9. A soil irrigating device consisting of an elongated sewn waterproof fabric structure providing two liquid distributing chambers arranged side by side and a branched liquid feed passage communicating with said chambers, the fabric of said structure having eyelets secured thereto providing a plurality of orifices for discharging liquid in jets from the liquid supplied under pressure to said chambers by the feed passage.

JAMES J. HEALY.

REFERENCES CITED

The following references are of record in the file of this patent:

UNITED STATES PATENTS

| Number | Name | Date |
|---|---|---|
| 1,180,807 | Vedder | Apr. 25, 1916 |
| 2,092,674 | Kennedy | Sept. 7, 1937 |
| 2,148,419 | Parker | Feb. 21, 1939 |